United States Patent
Kedalagudde et al.

(10) Patent No.: US 12,452,146 B2
(45) Date of Patent: Oct. 21, 2025

(54) SUPPORTING MULTIPLE APPLICATION FUNCTION SESSIONS WITH REQUIRED GROUP QUALITY OF SERVICE (QOS) PROVIDED BY MACHINE LEARNING MODEL PROVIDER APPLICATION FUNCTION

(71) Applicant: Intel Corporation, Santa Clara, CA (US)

(72) Inventors: Meghashree Dattatri Kedalagudde, Portland, OR (US); Puneet Jain, Portand, OR (US); Thomas Luetzenkirchen, Taufkirchen (DE); Abhijeet Kolekar, Portland, OR (US); Ching-Yu Liao, Portland, OR (US); Alexandre Saso Stojanovski, Paris (FR)

(73) Assignee: Intel Corporation, Santa Clara, CA (US)

( * ) Notice: Subject to any disclaimer, the term of this patent is extended or adjusted under 35 U.S.C. 154(b) by 199 days.

(21) Appl. No.: 18/160,714

(22) Filed: Jan. 27, 2023

(65) Prior Publication Data
US 2023/0171168 A1    Jun. 1, 2023

Related U.S. Application Data

(60) Provisional application No. 63/303,853, filed on Jan. 27, 2022.

(51) Int. Cl.
*H04L 12/00* (2006.01)
*H04L 41/50* (2022.01)
*H04W 72/543* (2023.01)

(52) U.S. Cl.
CPC ....... *H04L 41/5058* (2013.01); *H04W 72/543* (2023.01)

(58) Field of Classification Search
CPC ............ H04L 41/5058; H04L 41/0893; H04L 41/0894; H04L 41/5022; H04L 41/16; H04W 72/543; G06N 20/00
(Continued)

(56) References Cited

U.S. PATENT DOCUMENTS

2023/0064154 A1*  3/2023  Bouazizi ................. H04L 65/80

OTHER PUBLICATIONS

Lv H, CN 116095821 A, Method for Acquiring Information of Network Element, Involves Utilizing First Network Element to Receive First Request Sent by Second Network Element, and Using First Request to Request to Provide Quality-of-Service for Application Function Session, 2021 (Year: 2021).*

(Continued)

*Primary Examiner* — Frantz Coby
(74) *Attorney, Agent, or Firm* — Eversheds Sutherland (US) LLP

(57) ABSTRACT

Embodiments herein provide techniques related to a NEF. An example technique includes identifying, from an AF that implements a ML model, a request related to reservation of resources for a plurality of AF sessions, wherein the plurality of AF sessions relate to respective UEs of a plurality of UEs, and wherein the request includes an indication of addresses of respective UEs of the plurality of UEs and a QoS parameter; transmitting, to a BSF of the cellular network, a discovery request related to discovery of respective PCFs that are serving the respective UEs of the plurality of UEs; identifying, based on the discovery request, a discovery response that includes indications of the PCFs; identifying, based on the indications of the PCFs and the QoS parameter, a result related to the reservation of resources; and transmitting, to the AF, an indication of the result. Other embodiments may be described and/or claimed.

20 Claims, 6 Drawing Sheets

(58) Field of Classification Search
USPC .......................................................... 370/254
See application file for complete search history.

(56) References Cited

OTHER PUBLICATIONS

Consoli et al., WO 2022248032 A1, First Network Node for Communication System, Transmits Third Message to Client Device or Application Function (AF) Associated With PDU Session, Third Message Indicating Prediction Outcome for Quality of Service (QoS) Flow, 2021 (Year: 2021).*

* cited by examiner

SUPPORTING MULTIPLE APPLICATION FUNCTION SESSIONS WITH REQUIRED GROUP QUALITY OF SERVICE (QOS) PROVIDED BY MACHINE LEARNING MODEL PROVIDER APPLICATION FUNCTION

CROSS REFERENCE TO RELATED APPLICATION

The present application claims priority to U.S. Provisional Patent Application No. 63/303,853, which was filed Jan. 27, 2022; the disclosure of which is hereby incorporated by reference.

FIELD

Various embodiments generally may relate to the field of wireless communications. For example, some embodiments may relate to supporting multiple application function (AF) sessions.

BACKGROUND

Various embodiments generally may relate to the field of wireless communications.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
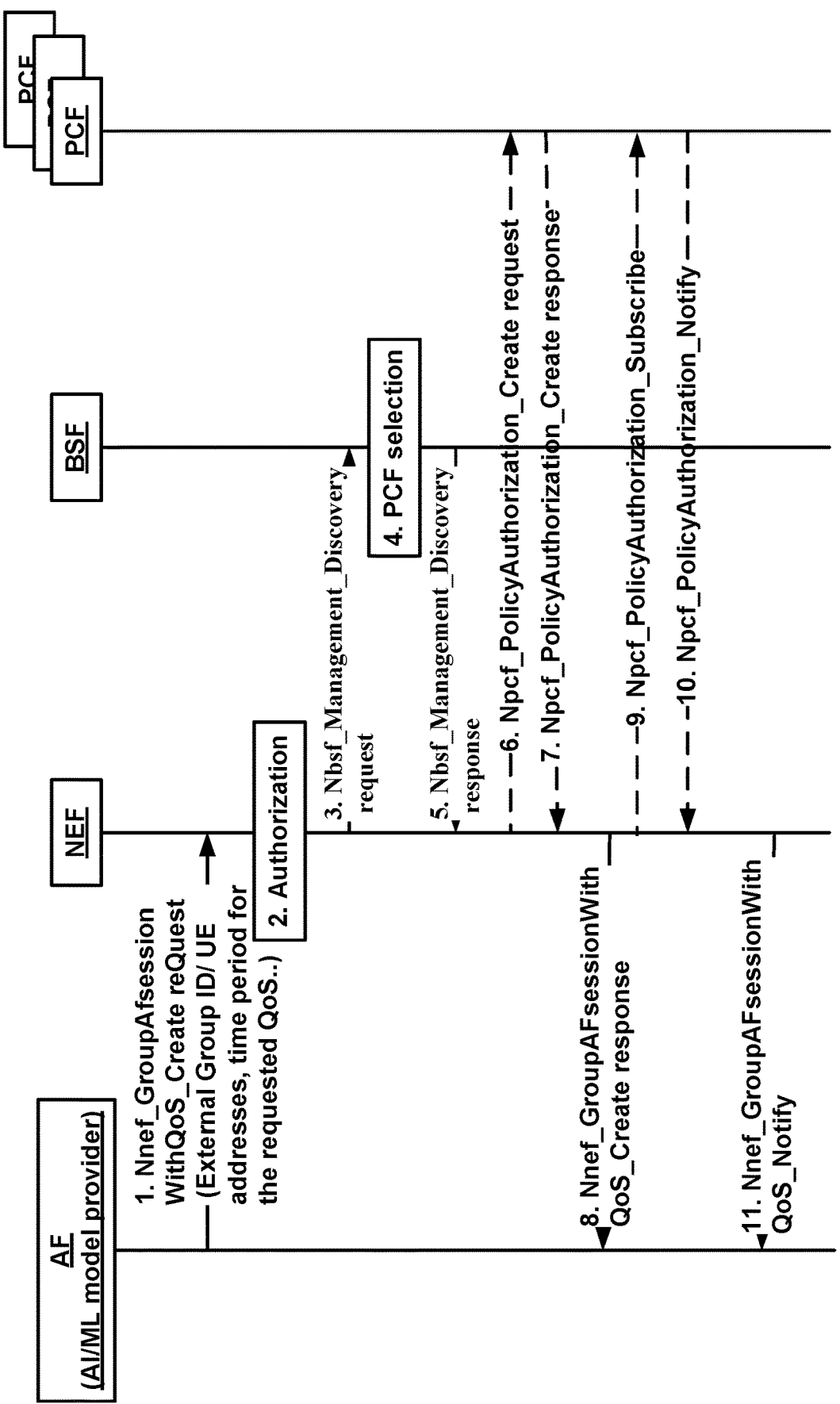
FIG. 1 schematically illustrates a wireless network in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

As defined in the third generation partnership project (3GPP) Release-18 (Rel-18) artificial intelligence (AI)/machine learning (ML) model transfer (AMMT) requirement, there may be a need to allow the AI/ML Services & Transmissions with fifth generation (5G) system (5GS) assistance to support AI/ML model distribution, transfer, training for various applications e.g. video/speech recognition, robot control, automotive, etc., for one or more of the following three example types of AI/ML operations (although, in some embodiments, such assistance may be desirable for additional or alternative AI/ML operations):

a. AI/ML operation splitting between AI/ML endpoints
    b. AI/ML model/data distribution and sharing over 5GS
    c. Distributed/Federated Learning (FL) over 5GS A corresponding SA2 AIMLsys study describes an additional concept that may be related in some embodiments:

Possible QoS, Policy enhancements to support Application AIML operational traffic while supporting regular (non-Application-AIML) 5GS user traffic.

Various embodiments herein relate to 5GS QoS and policy procedure enhancements to support Application AI/ML operational traffic between an AL/MVL model provider and a user equipment (UE), e.g., which may cater to an efficient AF session with a required group QoS handling in the network, which, in turn, may allow for the best chance for a successful iteration (for example, to support FL over 5GS). Some embodiments may relate to how to set up AF sessions with a group of UE's selected by the AI/ML model provider? Some embodiments may relate to a pre-required condition related to how the network status information exposed to the ML model provider AF may aid the AF to select the best group of UEs (referred to herein as FL member selection) for a given FL round/iteration.

Significant computation may be required both on the UE and the ML model provider server to execute one round/iteration of the FL task. For each iteration, the server may select FL members (UEs) that will participate in this iteration, perform relevant configuration, download the global model, relevant model parameters and then wait for the UEs to report back with the updated local model. In some embodiments, only if enough UEs report back will the iteration be considered successful, else the iteration is abandoned. Given this, to ensure most of the iterations are successful, which may result in the generation of an optimum global model e.g., to avoid straggling devices (e.g., devices which do not report back in time or do not respond on configuration by the server), it may be beneficial if the 5GS can expose relevant network status/information to allow an AF to select the FL members with best chance for a successful iteration.

The selection of devices for a given iteration may be considered to be within the scope of AF (e.g., the ML model provider). However, the 5GS may be able to aid the AF to make intelligent decisions (e.g., decisions relates to generating the best chance for a successful iteration within a given period of time) regarding FL member selection.

Embodiments herein may relate to a procedure to set up multiple AF sessions (e.g., an AF session with all the UEs selected by the ML provider AF for a given iteration/round). As FL learning may involve participation from multiple UE's, the AF server at the beginning of a training epoch may select a set of K clients out of N possible clients. The K clients may participate in the FL. Also, embodiments herein may relate to techniques and/or parameters that may be used for selection of devices for a given iteration. The parameters may be transmitted by virtue of 5G messages along with QoS parameters.

Embodiment 1: Setting Up Multiple AF Sessions with Required QoS for a Group—Network Exposure Function (NEF) Service Operations to Support Group AF Session Setup FIG. 1 depicts an example technique related to setting up multiple AF sessions with required QoS for a group. It will be understood that this technique is intended as one example technique that is in accordance with one embodiment, and other embodiments may include additional or alternative elements than are depicted in FIG. 1.

Initially, at element 1, the application function (AF) may send a request to reserve resources for multiple AF sessions using a Nnef_GroupAFsessionWithQoS_Create request message. The request message may include one or more of: External Group identifier (ID) or UE addresses, AF ID, Flow description(s) or External Application Identifier, QoS reference, data network name (DNN), single-network slice selection assistance information (S-NSSAI), time period for the requested QoS, wireless link condition threshold, deadline for parameter update, quality of data, etc. Optionally, a traffic volume for the requested QoS, minimum UEs in the group with requested QoS, can be included in the AF request. It will be understood that these parameters are intended as example parameters in accordance with some embodiments, and other embodiments may use additional/alternative parameters.

The request message may be transmitted to the NEF. The AF may provide an external group ID mapped to the target UE identifiers by the NEF, or the AF may provide a list of UE addresses mapped to the internal UE identifier by the NEF. The time period for the requested QoS may be determined by the ML model provider AF based on the tolerance for dropout UEs for a given round. Tolerance of the drop out of the UE as specified in the QoS parameters may depend on the wireless link conditions, deadline of FL parameter update, Quality of data, and/or some other additional or alternative parameters. The QoS Reference included in the AF request may point to the QoS parameter set for the group. The AF may, instead of QoS reference provide QoS parameters for the group of UEs. From the AF point of view, the minimum UEs in a group with requested QoS may indicate the minimum number of UEs in the group for which the required QoS (as indicated, for example by the QoS reference or QoS parameters for the group by the AF) must be guaranteed to initiate a round of FL task with best chance for a successful iteration.

The NEF may assign a Transaction Reference ID to the Nnef_GroupAFsessionWithQoS_Create request. The NEF authorizes, at element 2, the AF request and may apply policies to control the overall amount of QoS authorized for the AF. If the authorization is not granted, other elements of FIG. 1 (with the exception of element 8) may be skipped, and the NEF may reply to the AF with a Result value indicating that the authorization failed.

The NEF may use the list of UE addresses in element 1 to send, at element 3, a Nbsf_Management_Discovery request to a binding support function (BSF) to discover one or more policy control function(s) (PCF(s)) serving the UEs of the indicated group in the AF request.

In some embodiments, (not shown in FIG. 1), if the AF is considered to be trusted by the operator, the AF may use the Npcf_PolicyAuthorization_Create request message to interact directly with PCF(s) to request reserving resources for an AF session or send a Nbsf_Management_Discovery request directly to the BSF to discover the PCF(s) serving the UEs.

The BSF may then perform, at element 4, PCF discovery based on the input provided by the NEF (and/or the AF as described above).

The BSF may then send, at element 5, a Nbsf_Management_Discovery response that includes the list of PCF(s) serving the UEs of the indicated group that was previously provided by the AF.

In some embodiments, if the AF is trusted by the operator, the BSF may send a Nbsf_Management_Discovery response that includes the list of PCF(s) associating to the UEs of the indicated group that was previously provided by the AF. In some embodiments, each PCF may be associated to different UEs of the indicated group.

The NEF may interact, at element 6, with the PCF by triggering a Npcf_PolicyAuthorization_Create request. In some embodiments, the Npcf_PolicyAuthorization_Create request may include indications of one or more of the UE address, AF Identifier, Flow description(s), the QoS Reference, and the optional Alternative Service Requirements (or additional or alternative parameters).

In some embodiments, if multiple UE(s) from the AF group are served by the same PCF, the NEF may trigger one Npcf_PolicyAuthorization_Create request towards the PCF with one or more UE address(es), AF Identifier, Flow description(s), the QoS Reference and the optional Alternative Service Requirements as input parameters.

In some embodiments (not shown in FIG. 1), if multiple UE(s) from the AF group are served by the same PCF, the NEF may trigger a Npcf_GroupPolicyAuthorization_Create request towards the PCF with UE address(es), AF Identifier, Flow description(s), the QoS Reference and the optional Alternative Service Requirements as input parameters.

For requests received from the NEF in step 6, the PCF may determine whether the request is authorized and notifies the NEF if the request is not authorized. If the request is authorized, the PCF derives the required QoS parameters based on the information provided by the NEF and determines whether this QoS is allowed (according to the PCF configuration), and notifies the result to the NEF. In some embodiments, such notification may be indicated through transmission of a Npcf_PolicyAuthorization_Create response message as shown at element 7.

In another embodiment, if multiple UE(s) from the AF group are served by the same PCF, the PCF may send, at element 7, an Npcf_PolicyAuthorization_Create response with the result (e.g., success or failure) associated with the list of UEs for which policy authorization was successful and reason for failure for the list of UEs for which policy authorization failed.

In other embodiment, (not shown in FIG. 1) if multiple UE(s) from the AF group are served by the same PCF, the PCF may send a Npcf_GroupAuthorization_Create response with the result (e.g., success or failure) associated with the list of UEs for which policy authorization was successful and reason for failure for the list of UEs for which policy authorization failed.

If the AF is considered to be trusted by the operator, the PCF may send the Npcf_PolicyAuthorization_Create response message directly to AF (not shown in FIG. 1).

In other embodiment, if the AF is trusted by the operator, the PCF may send the Npcf_GroupPolicyAuthorization_Create response message directly to the AF (not shown in FIG. 1).

If the PCF determines that the session management function (SMF) serving the UE needs updated policy information, the PCF may issue a Npcf_SMPolicyControl_UpdateNotify request with updated policy information about the protocol data unit (PDU) Session.

If the request is not authorized, or the required QoS is not allowed, the NEF may respond to the AF in element 8 with a Result value indicating the failure cause.

In some embodiments, elements 6 and 7 may be repeated for various ones of the PCF(s) identified in elements 4 and/or 5.

The NEF may track the result(S) provided at element 7 from respective ones of the PCFs identified in elements 4 and/or 5. If a minimum number of UEs exist in the group, and the UEs are able to operate in accordance with the requested QoS parameter provided in step 1, and the results from the PCFs matches or exceeds the minimum UEs in the group with requested QoS parameter, then the NEF may send a Nnef_GroupAFsessionWithQoS_Create response message at element 8 to the AF. The Nnef_GroupAFsessionWithQoS_Create response message may include one or more of: Transaction Reference ID, Result (UEs in the group for which the QoS is granted), and/or one or more additional or alternative parameters. The Result element of the response message at element 8 may indicate that the request provided at element 1 is granted. The UEs in the group for which the QoS is granted parameter may be included in the response when the response from PCF(s) to NEF in element 7 indicates that the required QoS for UE(s) is not allowed for all of the UEs belonging to the FL group (provided as input in element 1).

The NEF may send, at element 9, a Npcf_PolicyAuthorization_Subscribe message to the PCF(s) to subscribe to notifications of Resource allocation status. The PCF may respond with a Subscription Correlation ID that may allow the NEF to track all the subscription notification unique to various UEs in the group.

When the event condition is met, e.g., the establishment of the transmission resources corresponding to the QoS update succeeded or failed, then the QoS target can no longer be fulfilled. In this case, the PCF may send, at element 10, an Npcf_PolicyAuthorization_Notify message to the NEF notifying the NEF about the event. The PCF may include the event information and Notification correlation information (e.g., information to identify the group application session).

In an embodiment (not shown), if the operator trusts the AF, then the PCF(s) may send the Npcf_PolicyAuthorization_Notify message directly to AF.

When the NEF receives the Npcf_PolicyAuthorization_Notify for the UEs for which the request was granted in element 8, the NEF may send, at element 11, a Nnef_GroupAFsessionWithQoS_Notify message with the event reported by the PCF(s) to the AF. The Nnef_GroupAFsessionWithQoS_Notify message may include indications of resources allocated for the UEs for which the request was granted in element 8 with the Transaction Reference ID.

In some embodiments (not shown), the AF may send a Nnef_GroupAFsessionWithQoS_Revoke request to the NEF to revoke the AF request.

Solution 2: Setting Up Multiple AF Sessions with Required QoS for a Group—Using Legacy Rel-17 NEF Service Operations to Support Group AF Session Setup Using Additional Parameters in the NEF Service Operation Request Message.

In another embodiment, an AF session with required QoS as defined in Rel-17 can be enhanced to support a Group AF session by including the External Group ID or list of UE's belong to the group in the Nnef_AFsessionwithQoS request message. The below offers some examples of how such enhancement may be used, although it will be recognized that other embodiments may use additional or alternative parameters.

Initially, the AF may a request to reserve resources for multiple AF session using Nnef_AFsessionWithQoS_Create request message to the NEF. Such a request may be similar to element 1 of FIG. 1. The request message may include one or more of: External Group ID or UE addresses, AF Identifier, Flow description(s) or External Application Identifier, QoS reference, DNN, S-NSSAI, time period for the requested QoS, etc. Optionally, an indication of traffic volume for the requested QoS, and/or an indication of minimum UEs in the group with requested QoS may be included in the AF request.

The AF may provide an external group ID mapped to the target UE identifiers by the NEF and/or the AF may provide a list of UE addresses mapped to the internal UE identifier by the NEF. The time period for the requested QoS may be determined by the ML model provider AF based on the tolerance for drop out UEs for a given round/iteration. The QoS Reference included in the AF request may point to the QoS parameter set for the group. Instead of QoS reference, the AF may provide QoS parameters for one or more of the group of UEs. From the AF point of view, the minimum UEs in a group with requested QoS may indicate the minimum number of UEs in the group for which the required QoS (as indicated by the QoS reference or QoS parameters for the group by the AF) must be guaranteed to initiate a round of FL tasks with a likelihood of successful iteration.

The NEF may assign a Group Transaction Reference ID to the received Nnef_AFsessionWithQoS_Create request. The NEF may authorize, in a manner similar to element 2 of FIG. 1, the AF request and may apply policies to control the overall amount of QoS authorized for the AF. If the authorization is not granted, then the NEF may reply (in a manner similar to element 8) to the AF with a Result value that indicates that the authorization failed. If external group ID or a list of UEs are included in the request message, then the NEF may proceed with setting up multiple AF sessions with the UEs belonging to the group. Subsequently, element 3-7 of FIG. 1 may be performed as described above.

The NEF may track the result(s) from element 7 from the PCFs identified in elements 4/5, as previously described. If a minimum number of UEs in the group with the requested QoS parameter are identified, and the results from the PCFs matches or exceeds the minimum number of UEs in the group with the requested QoS parameter, the NEF may send a Nnef_AFsessionWithQoS_Create response message that may include one or more of a Transaction Reference ID and a Result (e.g., the UEs in the group for which the QoS is granted). The Nnef_AFsessionWithQoS_Create response message may be transmitted to the AF, and the Result field may indicate that the request is granted. The UEs in the group for which the QoS is granted parameter may be included in the response when the response from PCF(s) to NEF in element 7 indicates required QoS for UE(s) is not allowed for all the UEs belonging to the FL group (provided as input as previously described).

The NEF may then send, in a manner similar to that previously described with respect to element 9, a Npcf_PolicyAuthorization_Subscribe message to the PCF(s) to subscribe to notifications of Resource allocation status. The PCF(s) may respond with a Subscription Correlation ID which may allow the NEF to track the subscription notification(s) unique to respective UEs in the group.

When the event condition is met, e.g., the establishment of the transmission resources corresponding to the QoS update succeeded or failed, the QoS target may no longer be fulfilled, the PCF may send (in a manner similar to element 10, previously described) a Npcf_PolicyAuthorization_Notify message to the NEF notifying about the event. The PCF may include the event information and Notification correlation information (e.g., information to identify the application session for the group).

If the AF is considered to be trusted by the operator, the PCF(s) may send the Npcf_PolicyAuthorization_Notify message directly to AF.

When the NEF receives the Npcf_PolicyAuthorization_Notify for all the UEs for which the request was granted as previously described, the NEF may send a Nnef_AFsessionWithQoS_Notify message with the event reported by the PCF(s) to the AF e.g., QoS resource allocated for all the UEs for which the request was granted with the Group Transaction Reference ID.

The AF may send a Nnef_AFsessionWithQoS_Revoke request to the NEF to revoke the AF request.

Solution 3:

In another embodiment, the legacy release-17 (Rel-17) procedure for establishing an AFsession with required QoS may be reused. The ML model provider AF may trigger multiple AF sessions with required QoS requests depending on the number of UEs selected for a given iteration of FL by the Application. The Transaction ID returned from the NEF to the ML model provider AF may be unique to each UE belonging to the FL group.

Systems and Implementations

FIGS. 2-5 illustrate various systems, devices, and components that may implement aspects of disclosed embodiments.

Figure 2:
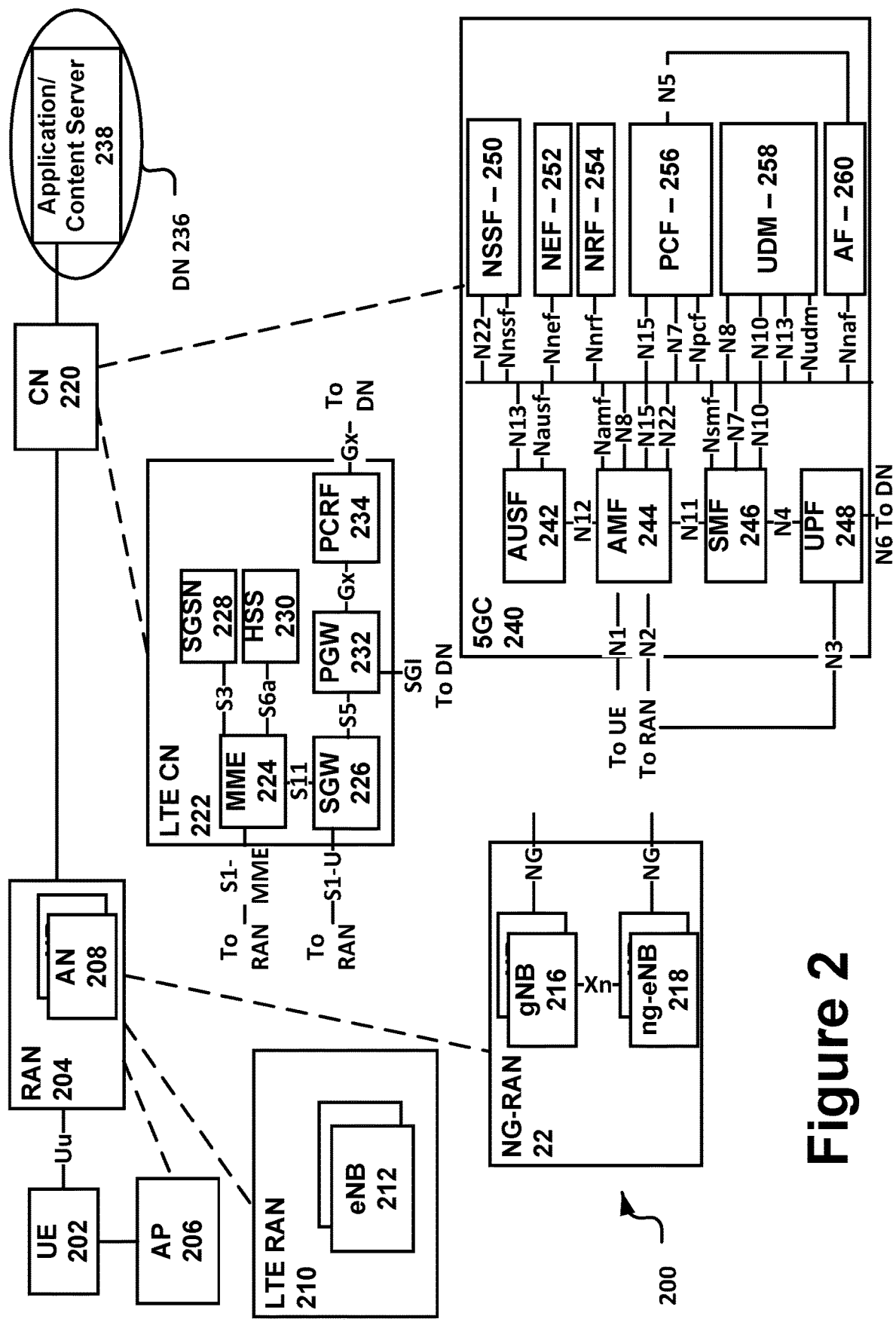
FIG. 2 schematically illustrates a wireless network in accordance with various embodiments.

FIG. 2 illustrates a network 200 in accordance with various embodiments. The network 200 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 200 may include a UE 202, which may include any mobile or non-mobile computing device designed to communicate with a RAN 204 via an over-the-air connection. The UE 202 may be communicatively coupled with the RAN 204 by a Uu interface. The UE 202 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 200 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 202 may additionally communicate with an AP 206 via an over-the-air connection. The AP 206 may manage a WLAN connection, which may serve to offload some/all network traffic from the RAN 204. The connection between the UE 202 and the AP 206 may be consistent with any IEEE 802.11 protocol, wherein the AP 206 could be a wireless fidelity (Wi-Fi®) router. In some embodiments, the UE 202, RAN 204, and AP 206 may utilize cellular-WLAN aggregation (for example, LWA/LWIP). Cellular-WLAN aggregation may involve the UE 202 being configured by the RAN 204 to utilize both cellular radio resources and WLAN resources.

The RAN 204 may include one or more access nodes, for example, AN 208. AN 208 may terminate air-interface protocols for the UE 202 by providing access stratum protocols including RRC, PDCP, RLC, MAC, and L1 protocols. In this manner, the AN 208 may enable data/voice connectivity between CN 220 and the UE 202. In some embodiments, the AN 208 may be implemented in a discrete device or as one or more software entities running on server computers as part of, for example, a virtual network, which may be referred to as a CRAN or virtual baseband unit pool. The AN 208 be referred to as a BS, gNB, RAN node, eNB, ng-eNB, NodeB, RSU, TRxP, TRP, etc. The AN 208 may be a macrocell base station or a low power base station for providing femtocells, picocells or other like cells having smaller coverage areas, smaller user capacity, or higher bandwidth compared to macrocells.

In embodiments in which the RAN 204 includes a plurality of ANs, they may be coupled with one another via an X2 interface (if the RAN 204 is an LTE RAN) or an Xn interface (if the RAN 204 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 204 may each manage one or more cells, cell groups, component carriers, etc. to provide the UE 202 with an air interface for network access. The UE 202 may be simultaneously connected with a plurality of cells provided by the same or different ANs of the RAN 204. For example, the UE 202 and RAN 204 may use carrier aggregation to allow the UE 202 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 204 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 202 or AN 208 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 204 may be an LTE RAN 210 with eNBs, for example, eNB 212. The LTE RAN 210 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 204 may be an NG-RAN 214 with gNBs, for example, gNB 216, or ng-eNBs, for example, ng-eNB 218. The gNB 216 may connect with 5G-enabled UEs using a 5G NR interface. The gNB 216 may connect with a 5G core through an NG interface, which may include an N2 interface or an N3 interface. The ng-eNB 218 may also connect with the 5G core through an NG interface, but may connect with a UE via an LTE air interface. The gNB 216 and the ng-eNB 218 may connect with each other over an Xn interface.

In some embodiments, the NG interface may be split into two parts, an NG user plane (NG-U) interface, which carries traffic data between the nodes of the NG-RAN 214 and a UPF 248 (e.g., N3 interface), and an NG control plane (NG-C) interface, which is a signaling interface between the nodes of the NG-RAN 214 and an AMF 244 (e.g., N2 interface).

The NG-RAN 214 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 202 can be configured with multiple BWPs where each BWP configuration has a different SCS. When a BWP change is indicated to the UE 202, the SCS of the transmission is changed as well. Another use case example of BWP is related to power saving. In particular, multiple BWPs can be configured for the UE 202 with different amount of frequency resources (for example, PRBs) to support data transmission under different traffic loading scenarios. A BWP containing a smaller number of PRBs can be used for data transmission with small traffic load while allowing power saving at the UE 202 and in some cases at the gNB 216. A BWP containing a larger number of PRBs can be used for scenarios with higher traffic load.

The RAN 204 is communicatively coupled to CN 220 that includes network elements to provide various functions to support data and telecommunications services to customers/subscribers (for example, users of UE 202). The components of the CN 220 may be implemented in one physical node or separate physical nodes. In some embodiments, NFV may be utilized to virtualize any or all of the functions provided by the network elements of the CN 220 onto physical compute/storage resources in servers, switches, etc. A logical instantiation of the CN 220 may be referred to as a network slice, and a logical instantiation of a portion of the CN 220 may be referred to as a network sub-slice.

In some embodiments, the CN 220 may be an LTE CN 222, which may also be referred to as an EPC. The LTE CN 222 may include MME 224, SGW 226, SGSN 228, HSS 230, PGW 232, and PCRF 234 coupled with one another over interfaces (or "reference points") as shown. Functions of the elements of the LTE CN 222 may be briefly introduced as follows.

The MME 224 may implement mobility management functions to track a current location of the UE 202 to facilitate paging, bearer activation/deactivation, handovers, gateway selection, authentication, etc.

The SGW 226 may terminate an S1 interface toward the RAN and route data packets between the RAN and the LTE CN 222. The SGW 226 may be a local mobility anchor point for inter-RAN node handovers and also may provide an anchor for inter-3GPP mobility. Other responsibilities may include lawful intercept, charging, and some policy enforcement.

The SGSN 228 may track a location of the UE 202 and perform security functions and access control. In addition, the SGSN 228 may perform inter-EPC node signaling for mobility between different RAT networks; PDN and S-GW selection as specified by MME 224; MME selection for handovers; etc. The S3 reference point between the MME 224 and the SGSN 228 may enable user and bearer information exchange for inter-3GPP access network mobility in idle/active states.

The HSS 230 may include a database for network users, including subscription-related information to support the network entities' handling of communication sessions. The HSS 230 can provide support for routing/roaming, authentication, authorization, naming/addressing resolution, location dependencies, etc. An S6a reference point between the HSS 230 and the MME 224 may enable transfer of subscription and authentication data for authenticating/authorizing user access to the LTE CN 220.

The PGW 232 may terminate an SGi interface toward a data network (DN) 236 that may include an application/content server 238. The PGW 232 may route data packets between the LTE CN 222 and the data network 236. The PGW 232 may be coupled with the SGW 226 by an S5 reference point to facilitate user plane tunneling and tunnel management. The PGW 232 may further include a node for policy enforcement and charging data collection (for example, PCEF). Additionally, the SGi reference point between the PGW 232 and the data network 236 may be an operator external public, a private PDN, or an intra-operator packet data network, for example, for provision of IMS services. The PGW 232 may be coupled with a PCRF 234 via a Gx reference point.

The PCRF 234 is the policy and charging control element of the LTE CN 222. The PCRF 234 may be communicatively coupled to the app/content server 238 to determine appropriate QoS and charging parameters for service flows. The PCRF 232 may provision associated rules into a PCEF (via Gx reference point) with appropriate TFT and QCI.

In some embodiments, the CN 220 may be a 5GC 240. The 5GC 240 may include an AUSF 242, AMF 244, SMF 246, UPF 248, NSSF 250, NEF 252, NRF 254, PCF 256, UDM 258, and AF 260 coupled with one another over interfaces (or "reference points") as shown. Functions of the elements of the 5GC 240 may be briefly introduced as follows.

The AUSF 242 may store data for authentication of UE 202 and handle authentication-related functionality. The AUSF 242 may facilitate a common authentication framework for various access types. In addition to communicating with other elements of the 5GC 240 over reference points as shown, the AUSF 242 may exhibit an Nausf service-based interface.

The AMF 244 may allow other functions of the 5GC 240 to communicate with the UE 202 and the RAN 204 and to subscribe to notifications about mobility events with respect to the UE 202. The AMF 244 may be responsible for registration management (for example, for registering UE 202), connection management, reachability management, mobility management, lawful interception of AMF-related events, and access authentication and authorization. The AMF 244 may provide transport for SM messages between the UE 202 and the SMF 246, and act as a transparent proxy for routing SM messages. AMF 244 may also provide transport for SMS messages between UE 202 and an SMSF. AMF 244 may interact with the AUSF 242 and the UE 202 to perform various security anchor and context management functions. Furthermore, AMF 244 may be a termination point of a RAN CP interface, which may include or be an N2 reference point between the RAN 204 and the AMF 244; and the AMF 244 may be a termination point of NAS (N1) signaling, and perform NAS ciphering and integrity protection. AMF 244 may also support NAS signaling with the UE 202 over an N3 IWF interface.

The SMF 246 may be responsible for SM (for example, session establishment, tunnel management between UPF 248 and AN 208); UE IP address allocation and management (including optional authorization); selection and control of UP function; configuring traffic steering at UPF 248 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 244 over N2 to AN 208; and determining SSC mode of a session. SM may refer to management of a PDU session, and a PDU session or "session" may refer to a PDU connectivity service that provides or enables the exchange of PDUs between the UE 202 and the data network 236.

The UPF 248 may act as an anchor point for intra-RAT and inter-RAT mobility, an external PDU session point of interconnect to data network 236, and a branching point to support multi-homed PDU session. The UPF 248 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 248 may include an uplink classifier to support routing traffic flows to a data network.

The NSSF 250 may select a set of network slice instances serving the UE 202. The NSSF 250 may also determine allowed NSSAI and the mapping to the subscribed S-NS-SAIs, if needed. The NSSF 250 may also determine the AMF set to be used to serve the UE 202, or a list of candidate AMFs based on a suitable configuration and possibly by querying the NRF 254. The selection of a set of network slice instances for the UE 202 may be triggered by the AMF 244 with which the UE 202 is registered by interacting with the NSSF 250, which may lead to a change of AMF. The NSSF 250 may interact with the AMF 244 via an N22 reference point; and may communicate with another NSSF in a visited network via an N31 reference point (not shown). Additionally, the NSSF 250 may exhibit an Nnssf service-based interface.

The NEF 252 may securely expose services and capabilities provided by 3GPP network functions for third party, internal exposure/re-exposure, AFs (e.g., AF 260), edge computing or fog computing systems, etc. In such embodiments, the NEF 252 may authenticate, authorize, or throttle the AFs. NEF 252 may also translate information exchanged with the AF 260 and information exchanged with internal network functions. For example, the NEF 252 may translate between an AF-Service-Identifier and an internal 5GC information. NEF 252 may also receive information from other NFs based on exposed capabilities of other NFs. This information may be stored at the NEF 252 as structured data, or at a data storage NF using standardized interfaces. The stored information can then be re-exposed by the NEF 252 to other NFs and AFs, or used for other purposes such as analytics. Additionally, the NEF 252 may exhibit an Nnef service-based interface.

The NRF 254 may support service discovery functions, receive NF discovery requests from NF instances, and provide the information of the discovered NF instances to the NF instances. NRF 254 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 254 may exhibit the Nnrf service-based interface.

The PCF 256 may provide policy rules to control plane functions to enforce them, and may also support unified policy framework to govern network behavior. The PCF 256 may also implement a front end to access subscription information relevant for policy decisions in a UDR of the UDM 258. In addition to communicating with functions over reference points as shown, the PCF 256 exhibit an Npcf service-based interface.

The UDM 258 may handle subscription-related information to support the network entities' handling of communication sessions, and may store subscription data of UE 202. For example, subscription data may be communicated via an N8 reference point between the UDM 258 and the AMF 244. The UDM 258 may include two parts, an application front end and a UDR. The UDR may store subscription data and policy data for the UDM 258 and the PCF 256, and/or structured data for exposure and application data (including PFDs for application detection, application request information for multiple UEs 202) for the NEF 252. The Nudr service-based interface may be exhibited by the UDR 221 to allow the UDM 258, PCF 256, and NEF 252 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 258 may exhibit the Nudm service-based interface.

The AF 260 may provide application influence on traffic routing, provide access to NEF, and interact with the policy framework for policy control.

In some embodiments, the 5GC 240 may enable edge computing by selecting operator/3rd party services to be geographically close to a point that the UE 202 is attached to the network. This may reduce latency and load on the network. To provide edge-computing implementations, the 5GC 240 may select a UPF 248 close to the UE 202 and execute traffic steering from the UPF 248 to data network 236 via the N6 interface. This may be based on the UE subscription data, UE location, and information provided by the AF 260. In this way, the AF 260 may influence UPF (re)selection and traffic routing. Based on operator deployment, when AF 260 is considered to be a trusted entity, the network operator may permit AF 260 to interact directly with relevant NFs. Additionally, the AF 260 may exhibit an Naf service-based interface.

The data network 236 may represent various network operator services, Internet access, or third party services that may be provided by one or more servers including, for example, application/content server 238.

Figure 3:
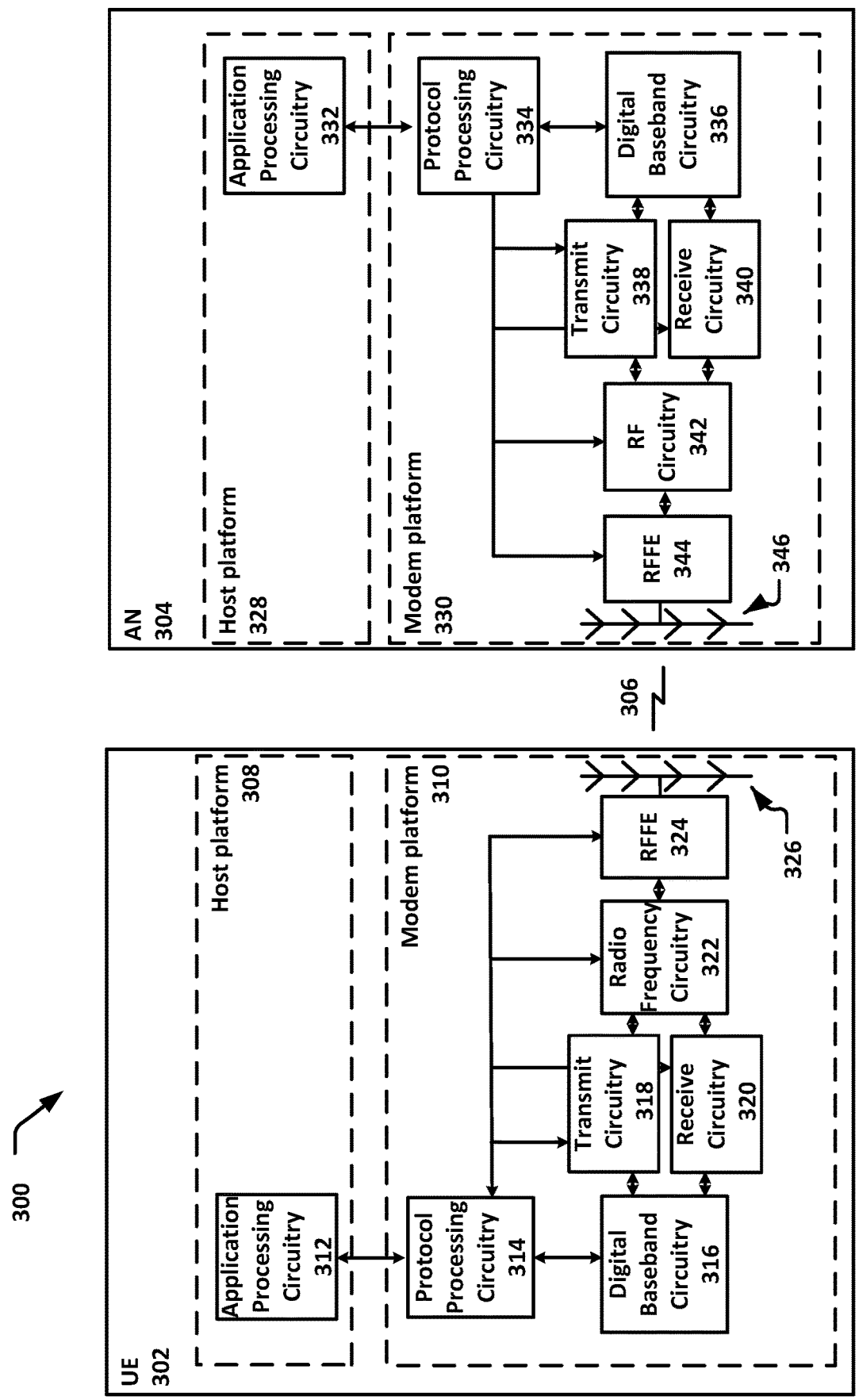
FIG. 3 schematically illustrates components of a wireless network in accordance with various embodiments.

FIG. 3 schematically illustrates a wireless network 300 in accordance with various embodiments. The wireless network 300 may include a UE 302 in wireless communication with an AN 304. The UE 302 and AN 304 may be similar to, and substantially interchangeable with, like-named components described elsewhere herein.

The UE 302 may be communicatively coupled with the AN 304 via connection 306. The connection 306 is illustrated as an air interface to enable communicative coupling, and can be consistent with cellular communications protocols such as an LTE protocol or a 5G NR protocol operating at mmWave or sub-6 GHz frequencies.

The UE 302 may include a host platform 308 coupled with a modem platform 310. The host platform 308 may include application processing circuitry 312, which may be coupled with protocol processing circuitry 314 of the modem platform 310. The application processing circuitry 312 may run various applications for the UE 302 that source/sink application data. The application processing circuitry 312 may further implement one or more layer operations to transmit/receive application data to/from a data network. These layer operations may include transport (for example UDP) and Internet (for example, IP) operations The protocol processing circuitry 314 may implement one or more of layer operations to facilitate transmission or reception of data over the connection 306. The layer operations implemented by the protocol processing circuitry 314 may include, for example, MAC, RLC, PDCP, RRC and NAS operations.

The modem platform 310 may further include digital baseband circuitry 316 that may implement one or more layer operations that are "below" layer operations performed by the protocol processing circuitry 314 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 310 may further include transmit circuitry 318, receive circuitry 320, RF circuitry 322, and RF front end (RFFE) 324, which may include or connect to one or more antenna panels 326. Briefly, the transmit circuitry 318 may include a digital-to-analog converter, mixer, intermediate frequency (IF) components, etc.; the receive circuitry 320 may include an analog-to-digital converter, mixer, IF components, etc.; the RF circuitry 322 may include a low-noise amplifier, a power amplifier, power tracking components, etc.; RFFE 324 may include filters (for example, surface/bulk acoustic wave filters), switches, antenna tuners, beamforming components (for example, phase-array antenna components), etc. The selection and arrangement of the components of the transmit circuitry 318, receive circuitry 320, RF circuitry 322, RFFE 324, and antenna panels 326 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 314 may include one or more instances of control circuitry (not shown) to provide control functions for the transmit/receive components.

A UE reception may be established by and via the antenna panels 326, RFFE 324, RF circuitry 322, receive circuitry 320, digital baseband circuitry 316, and protocol processing circuitry 314. In some embodiments, the antenna panels 326 may receive a transmission from the AN 304 by receive-beamforming signals received by a plurality of antennas/antenna elements of the one or more antenna panels 326.

A UE transmission may be established by and via the protocol processing circuitry 314, digital baseband circuitry 316, transmit circuitry 318, RF circuitry 322, RFFE 324, and antenna panels 326. In some embodiments, the transmit components of the UE 304 may apply a spatial filter to the data to be transmitted to form a transmit beam emitted by the antenna elements of the antenna panels 326.

Similar to the UE 302, the AN 304 may include a host platform 328 coupled with a modem platform 330. The host platform 328 may include application processing circuitry 332 coupled with protocol processing circuitry 334 of the modem platform 330. The modem platform may further include digital baseband circuitry 336, transmit circuitry 338, receive circuitry 340, RF circuitry 342, RFFE circuitry 344, and antenna panels 346. The components of the AN 304 may be similar to and substantially interchangeable with like-named components of the UE 302. In addition to performing data transmission/reception as described above, the components of the AN 308 may perform various logical functions that include, for example, RNC functions such as radio bearer management, uplink and downlink dynamic radio resource management, and data packet scheduling.

Figure 4:
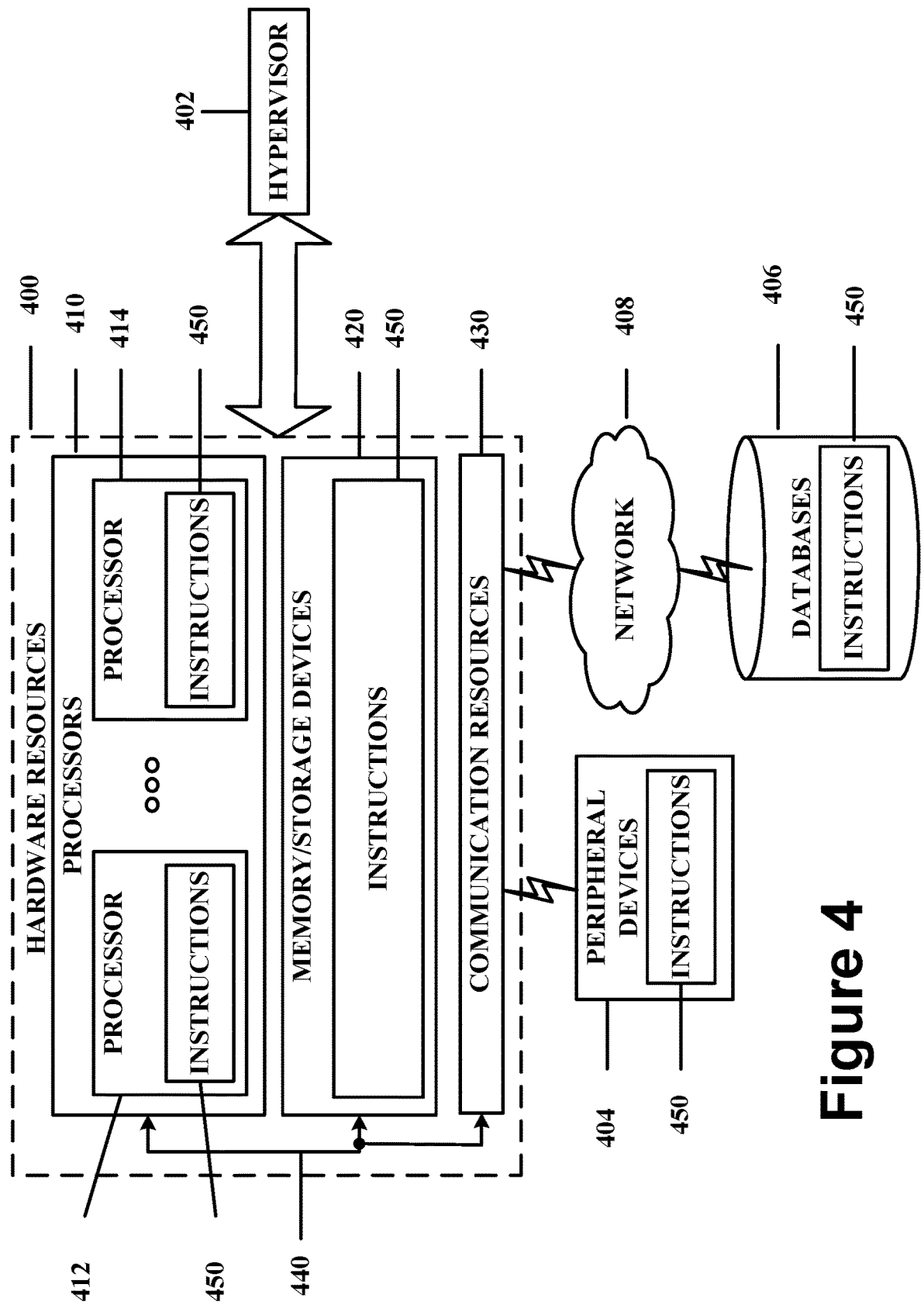
FIG. 4 is a block diagram illustrating components, according to some example embodiments, able to read instructions from a machine-readable or computer-readable medium (e.g., a non-transitory machine-readable storage medium) and perform any one or more of the methodologies discussed herein.

FIG. 4 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 4 shows a diagrammatic representation of hardware resources 400 including one or more processors (or processor cores) 410, one or more memory/storage devices 420, and one or more communication resources 430, each of which may be communicatively coupled via a bus 440 or other interface circuitry. For embodiments where node virtualization (e.g., NFV) is utilized, a hypervisor 402 may be executed to provide an execution environment for one or more network slices/subslices to utilize the hardware resources 400.

The processors 410 may include, for example, a processor 412 and a processor 414. The processors 410 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 420 may include main memory, disk storage, or any suitable combination thereof. The memory/storage devices 420 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 430 may include interconnection or network interface controllers, components, or other suitable devices to communicate with one or more peripheral devices 404 or one or more databases 406 or other network elements via a network 408. For example, the communication resources 430 may include wired communication components (e.g., for coupling via USB, Ethernet, etc.), cellular communication components, NFC components, Bluetooth® (or Bluetooth® Low Energy) components, Wi-Fi® components, and other communication components.

Instructions 450 may comprise software, a program, an application, an applet, an app, or other executable code for causing at least any of the processors 410 to perform any one or more of the methodologies discussed herein. The instructions 450 may reside, completely or partially, within at least one of the processors 410 (e.g., within the processor's cache memory), the memory/storage devices 420, or any suitable combination thereof. Furthermore, any portion of the instructions 450 may be transferred to the hardware resources 400 from any combination of the peripheral devices 404 or the databases 406. Accordingly, the memory of processors 410, the memory/storage devices 420, the peripheral devices 404, and the databases 406 are examples of computer-readable and machine-readable media.

Figure 5:
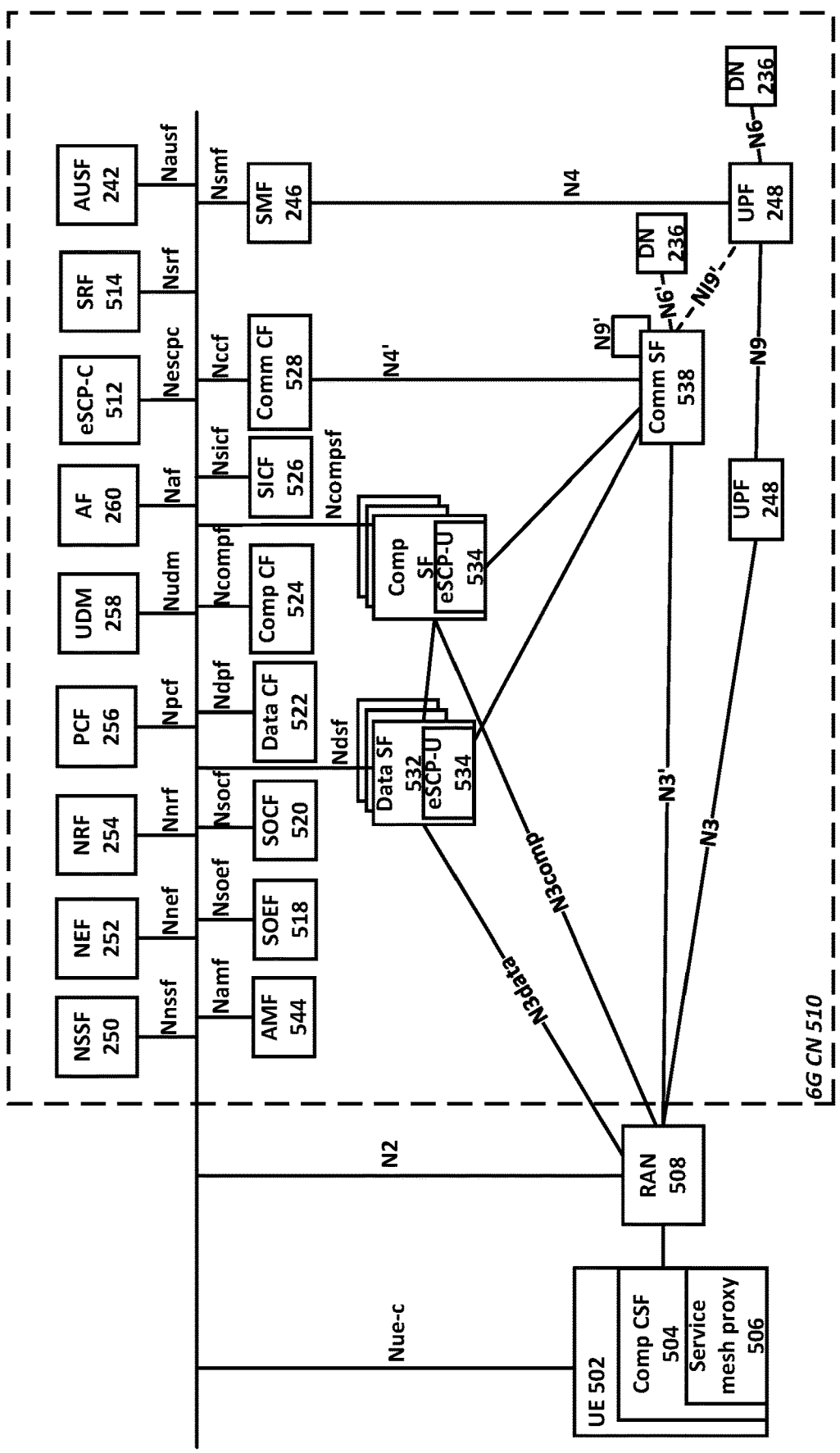
FIG. 5 illustrates a network in accordance with various embodiments.

FIG. 5 illustrates a network 500 in accordance with various embodiments. The network 500 may operate in a matter consistent with 3GPP technical specifications or technical reports for 6G systems. In some embodiments, the network 500 may operate concurrently with network 200. For example, in some embodiments, the network 500 may share one or more frequency or bandwidth resources with network 200. As one specific example, a UE (e.g., UE 502) may be configured to operate in both network 500 and network 200. Such configuration may be based on a UE including circuitry configured for communication with frequency and bandwidth resources of both networks 200 and 500. In general, several elements of network 500 may share one or more characteristics with elements of network 200. For the sake of brevity and clarity, such elements may not be repeated in the description of network 500.

The network 500 may include a UE 502, which may include any mobile or non-mobile computing device designed to communicate with a RAN 508 via an over-the-air connection. The UE 502 may be similar to, for example, UE 202. The UE 502 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

Although not specifically shown in FIG. 5, in some embodiments the network 500 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc. Similarly, although not specifically shown in FIG. 5, the UE 502 may be communicatively coupled with an AP such as AP 206 as described with respect to FIG. 2. Additionally, although not specifically shown in FIG. 5, in some embodiments the RAN 508 may include one or more ANss such as AN 208 as described with respect to FIG. 2. The RAN 508 and/or the AN of the RAN 508 may be referred to as a base station (BS), a RAN node, or using some other term or name.

The UE 502 and the RAN 508 may be configured to communicate via an air interface that may be referred to as a sixth generation (6G) air interface. The 6G air interface may include one or more features such as communication in a terahertz (THz) or sub-THz bandwidth, or joint communication and sensing. As used herein, the term "joint communication and sensing" may refer to a system that allows for wireless communication as well as radar-based sensing via various types of multiplexing. As used herein, THz or sub-THz bandwidths may refer to communication in the 80 GHz and above frequency ranges. Such frequency ranges may additionally or alternatively be referred to as "millimeter wave" or "mmWave" frequency ranges.

The RAN 508 may allow for communication between the UE 502 and a 6G core network (CN) 510. Specifically, the RAN 508 may facilitate the transmission and reception of data between the UE 502 and the 6G CN 510. The 6G CN 510 may include various functions such as NSSF 250, NEF 252, NRF 254, PCF 256, UDM 258, AF 260, SMF 246, and AUSF 242. The 6G CN 510 may additional include UPF 248 and DN 236 as shown in FIG. 5.

Additionally, the RAN 508 may include various additional functions that are in addition to, or alternative to, functions of a legacy cellular network such as a 4G or 5G network. Two such functions may include a Compute Control Function (Comp CF) 524 and a Compute Service Function (Comp SF) 536. The Comp CF 524 and the Comp SF 536 may be parts or functions of the Computing Service Plane. Comp CF 524 may be a control plane function that provides functionalities such as management of the Comp SF 536, computing task context generation and management (e.g., create, read, modify, delete), interaction with the underlaying computing infrastructure for computing resource management, etc. Comp SF 536 may be a user plane function that serves as the gateway to interface computing service users (such as UE 502) and computing nodes behind a Comp SF instance. Some functionalities of the Comp SF 536 may include: parse computing service data received from users to compute tasks executable by computing nodes; hold service mesh ingress gateway or service API gateway; service and charging policies enforcement; performance monitoring and telemetry collection, etc. In some embodiments, a Comp SF 536 instance may serve as the user plane gateway for a cluster of computing nodes. A Comp CF 524 instance may control one or more Comp SF 536 instances.

Two other such functions may include a Communication Control Function (Comm CF) 528 and a Communication Service Function (Comm SF) 538, which may be parts of the Communication Service Plane. The Comm CF 528 may be the control plane function for managing the Comm SF 538, communication sessions creation/configuration/releasing, and managing communication session context. The Comm SF 538 may be a user plane function for data transport. Comm CF 528 and Comm SF 538 may be considered as upgrades of SMF 246 and UPF 248, which were described with respect to a 5G system in FIG. 2. The upgrades provided by the Comm CF 528 and the Comm SF 538 may enable service-aware transport. For legacy (e.g., 4G or 5G) data transport, SMF 246 and UPF 248 may still be used.

Two other such functions may include a Data Control Function (Data CF) 522 and Data Service Function (Data SF) 532 may be parts of the Data Service Plane. Data CF 522 may be a control plane function and provides functionalities such as Data SF 532 management, Data service creation/configuration/releasing, Data service context management, etc. Data SF 532 may be a user plane function and serve as the gateway between data service users (such as UE 502 and the various functions of the 6G CN 510) and data service endpoints behind the gateway. Specific functionalities may include: parse data service user data and forward to corresponding data service endpoints, generate charging data, and report data service status.

Another such function may be the Service Orchestration and Chaining Function (SOCF) 520, which may discover, orchestrate and chain up communication/computing/data services provided by functions in the network. Upon receiving service requests from users, SOCF 520 may interact with one or more of Comp CF 524, Comm CF 528, and Data CF 522 to identify Comp SF 536, Comm SF 538, and Data SF 532 instances, configure service resources, and generate the service chain, which could contain multiple Comp SF 536, Comm SF 538, and Data SF 532 instances and their associated computing endpoints. Workload processing and data movement may then be conducted within the generated service chain. The SOCF 520 may also responsible for maintaining, updating, and releasing a created service chain.

Another such function may be the service registration function (SRF) 514, which may act as a registry for system services provided in the user plane such as services provided by service endpoints behind Comp SF 536 and Data SF 532 gateways and services provided by the UE 502. The SRF 514 may be considered a counterpart of NRF 254, which may act as the registry for network functions.

Other such functions may include an evolved service communication proxy (eSCP) and service infrastructure control function (SICF) 526, which may provide service communication infrastructure for control plane services and user plane services. The eSCP may be related to the service communication proxy (SCP) of 5G with user plane service communication proxy capabilities being added. The eSCP is therefore expressed in two parts: eCSP-C 512 and eSCP-U 534, for control plane service communication proxy and user plane service communication proxy, respectively. The SICF 526 may control and configure eCSP instances in terms of service traffic routing policies, access rules, load balancing configurations, performance monitoring, etc.

Another such function is the AMF 544. The AMF 544 may be similar to 244, but with additional functionality. Specifically, the AMF 544 may include potential functional repartition, such as move the message forwarding functionality from the AMF 544 to the RAN 508.

Another such function is the service orchestration exposure function (SOEF) 518. The SOEF may be configured to expose service orchestration and chaining services to external users such as applications.

The UE 502 may include an additional function that is referred to as a computing client service function (comp CSF) 504. The comp CSF 504 may have both the control plane functionalities and user plane functionalities, and may interact with corresponding network side functions such as SOCF 520, Comp CF 524, Comp SF 536, Data CF 522, and/or Data SF 532 for service discovery, request/response, compute task workload exchange, etc. The Comp CSF 504 may also work with network side functions to decide on whether a computing task should be run on the UE 502, the RAN 508, and/or an element of the 6G CN 510.

The UE 502 and/or the Comp CSF 504 may include a service mesh proxy 506. The service mesh proxy 506 may act as a proxy for service-to-service communication in the user plane. Capabilities of the service mesh proxy 506 may include one or more of addressing, security, load balancing, etc.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Figure 6:
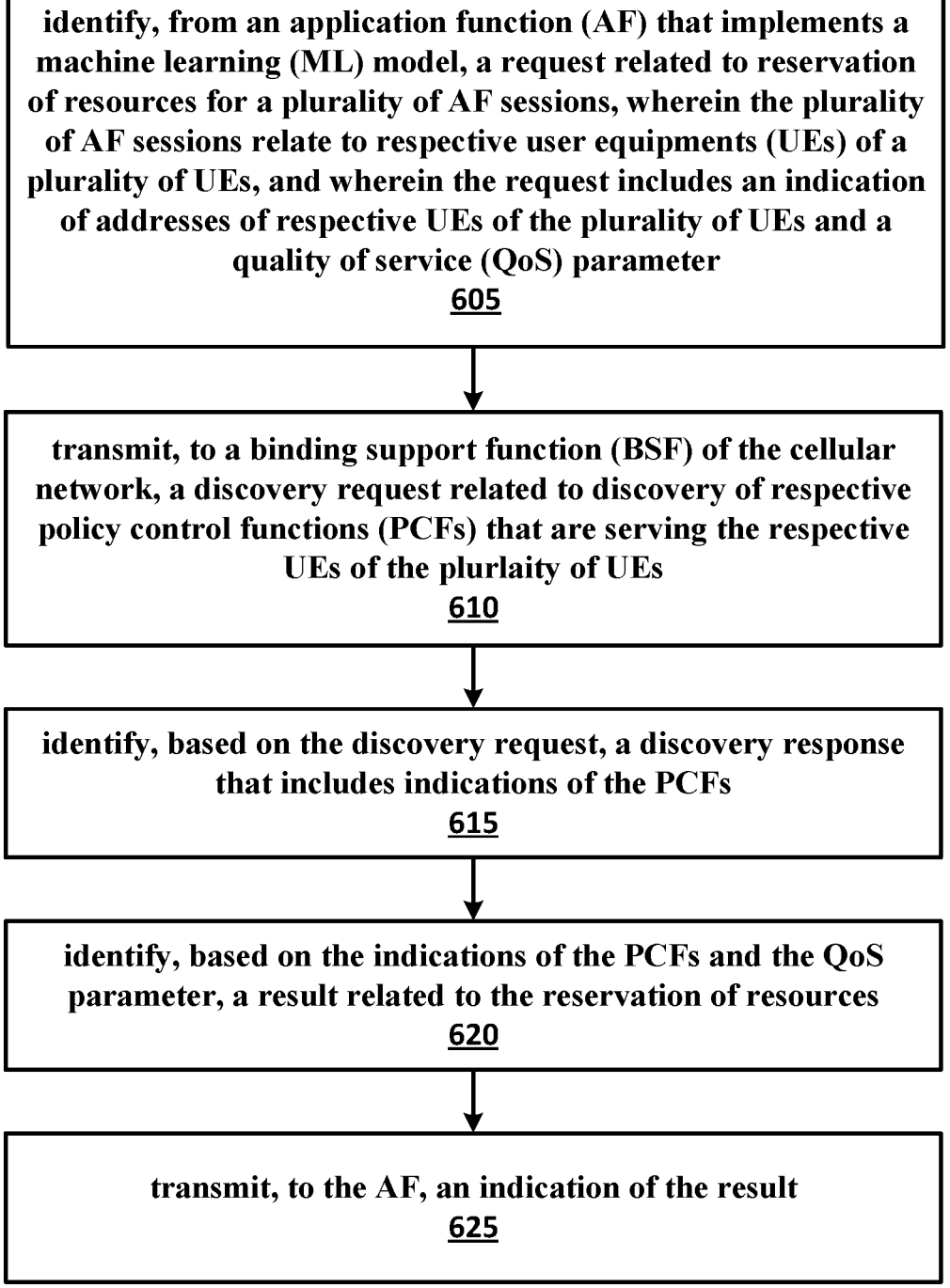
FIG. 6 depicts an example procedure for practicing the various embodiments discussed herein.

In some embodiments, the electronic device(s), network(s), system(s), chip(s) or component(s), or portions or implementations thereof, of FIGS. 1-5, or some other figure herein, may be configured to perform one or more processes, techniques, or methods as described herein, or portions thereof. One such process is depicted in FIG. 6. The process may include or relate to a method to be performed by a network exposure function (NEF), one or more elements, components, routines, or subroutines of an NEF, and/or one or more electronic devices that include or implement an NEF. The process may include identifying, at 605 from an application function (AF) that implements a machine learning (ML) model, a request related to reservation of resources for a plurality of AF sessions, wherein the plurality of AF sessions relate to respective user equipments (UEs) of a plurality of UEs, and wherein the request includes an indication of addresses of respective UEs of the plurality of UEs and a quality of service (QoS) parameter; transmitting, at 610 to a binding support function (BSF) of the cellular network, a discovery request related to discovery of respective policy control functions (PCFs) that are serving the respective UEs of the plurality of UEs; identifying, at 615 based on the discovery request, a discovery response that includes indications of the PCFs; identifying, at 620 based on the indications of the PCFs and the QoS parameter, a result related to the reservation of resources; and transmitting, at 625 to the AF, an indication of the result.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 includes a method where the ML provider Application Function sends a Nnef_GroupAFsessionWithQoS_Create request message with one or more of External Group ID or UE addresses, time period for the requested QoS, wireless link condition threshold, deadline for parameter update, quality of data, traffic volume for the requested QoS, and/or minimum UEs in the group with requested QoS.

Example 2 includes a method of example 1 or some other example herein, where the time period for the requested QoS is determined by the ML provider AF based on the tolerance for dropout UEs for a given round and the minimum UEs in a group with requested QoS parameter indicates the minimum number of UEs in the group for which the required QoS as indicated by the QoS reference or QoS parameters for the group by the AF must be guaranteed to initiate a round of FL task with best chance for a successful iteration.

Example 3 includes a method from example 1 or some other example herein, where NEF uses the External Group ID or the list of UE addresses provided by the ML provider AF to sends a Nbsf_Management_Discovery request to BSF to discover the PCF(s) serving the UEs of the indicated group in the ML provider AF request.

Example 4 includes a method from example 3 or some other example herein, where the BSF sends a Nbsf_Management_Discovery response including the list of PCF(s) serving the UEs of the indicated group provided by the ML provider AF.

Example 5 includes a method from examples 3, 4, or some other example herein, where the NEF sends Npcf_PolicyAuthorization_Create request towards the PCF(s) identified by the BSF with UE address(es) if multiple UEs are served by the same PCF, AF Identifier, Flow description(s), the QoS Reference and the optional Alternative Service Requirements as input parameters.

Example 6 includes a method of examples 3, 4 or some other example herein, where the NEF sends a Npcf_GroupPolicyAuthorization_Create request towards the PCF(s) identified by the BSF with UE address(es) if multiple UEs are served by the same PCF, AF Identifier, Flow description(s), the QoS Reference and the optional Alternative Service Requirements as input parameters.

Example 7 includes a method of example 5 or some other example herein, where the PCF sends Npcf_PolicyAuthorization_Create response with the result as success or failure associated with the list of UEs for which policy authorization was successful and reason for failure for the list of UEs for which policy authorization failed.

Example 8 includes a method of example 6 or some other example herein, where the PCF sends Npcf_GroupAuthorization_Create response with the result (success or failure) associated with the list of UEs for which policy authorization was successful and reason for failure for the list of UEs for which policy authorization failed.

Example 9 includes a method of examples 6, 8, or some other example herein, where the PCF sends the Npcf_GroupPolicyAuthorization_Create response message directly to the AF, if the operator trusts the AF.

Example 10 includes a method of example 7 or some other example herein, where the NEF correlates all the Npcf_PolicyAuthorization_Create response received from the PCF(s) if it matches or exceeds the minimum UEs in the group with requested QoS parameter, the NEF sends a Nnef_GroupAFsessionWithQoS_Create response message with Transaction Reference ID, Result, UEs in the group for which the QoS is granted to the ML provider AF where the Result indicates that the request is granted.

Example 11 includes a method of example 8 or some other example herein, where the NEF correlates all the Npcf_GroupPolicyAuthorization_Create response received from the PCF(s) if it matches or exceeds the minimum UEs in the group with requested QoS parameter, the NEF sends a Nnef_GroupAFsessionWithQoS_Create response message with Transaction Reference ID, Result, UEs in the group for which the QoS is granted to the ML provider AF where the Result indicates that the request is granted.

Example 12 includes a method of examples 10, 11, or some other example herein, where the UEs in the group for which the QoS is granted parameter is included in the response only when the response from PCF(s) to NEF in indicates required QoS for UE(s) is not allowed for all the UEs belonging to the FL group.

Example 13 includes a method of examples 10, 11, 12, or some other example herein, where the NEF subscribes to the PCF events to receive notifications of Resource allocation status based on which when the event condition is met the PCF sends the notification to the NEF including the event information and notification correlation information to identify the group AF session.

Example 14 includes a method of example 1 or some other example herein, where the ML provider AF may send Nnef_GroupAFsessionWithQoS_Revoke request to NEF in order to revoke the AF request.

Example 15 includes a method where the ML provider AF sends the Nnef_AFsessionWithQoS_Create request message with External Group ID or UE addresses, time period for the requested QoS, wireless link condition threshold, deadline for parameter update, quality of data, traffic volume for the requested QoS, minimum UEs in the group with requested QoS.

Example 16 includes a method of example 14 or some other example herein, where the NEF assigns a Group Transaction Reference ID to the to the Nnef_AFsessionWithQoS_Create request based on the External Group IF or list of UE addresses included in the input parameters of Nnef_AFsessionWithQoS_Create request message.

Example 17 includes a method of examples 10, 11, 12, 16, or some other example herein, where the NEF subscribes to the PCF events to receive notifications of Resource allocation status based on which when the event condition is met the PCF sends the notification to the NEF including the event information and notification correlation information to identify the AF session for the group.

Example 18 includes a method of example 17 or some other example herein, where the NEF sends Nnef_AFsessionWithQoS_Notify message with the event reported by the PCF(s) to the ML provider AF e.g., QoS resource allocated for all the UEs for which the request was granted with the Group Transaction Reference ID.

Example 19 includes a method to be performed by a network exposure function (NEF), one or more elements, components, routines, or subroutines of an NEF, and/or one or more electronic devices that include or implement an NEF, wherein the method comprises: identifying, from an application function (AF) that implements a machine learning (ML) model, a request related to reservation of resources for a plurality of AF sessions, wherein the plurality of AF sessions relate to respective user equipments (UEs) of a plurality of UEs, and wherein the request includes an indication of addresses of respective UEs of the plurality of UEs and a quality of service (QoS) parameter; transmitting, to a binding support function (BSF) of the cellular network, a discovery request related to discovery of respective policy control functions (PCFs) that are serving the respective UEs of the plurality of UEs; identifying, based on the discovery request, a discovery response that includes indications of the PCFs; identifying, based on the indications of the PCFs and the QoS parameter, a result related to the reservation of resources; and transmitting, to the AF, an indication of the result.

Example 20 includes the method of example 19, and/or some other example herein, wherein the request related to reservation of resources is a Nnef_GroupAFsessionWithQoS_Create request message.

Example 21 includes the method of any of examples 19-20, and/or some other example herein, wherein the discovery request is a Nbsf_Management_Discovery request message.

Example 22 includes the method of any of examples 19-21, and/or some other example herein, wherein the discovery response is a Nbsf_Management_Discovery response message.

Example 23 includes the method of any of examples 19-22, and/or some other example herein, wherein the result is granting the request related to reservation of resources if a number of UEs of the plurality of UEs that are associated with a PCF that meets the QoS parameter is greater than a threshold number.

Example 24 includes the method of any of examples 19-23, and/or some other example herein, wherein the result is declining the request related to reservation of resources if a number of UEs of the plurality of UEs that are associated with a PCF that meets the QoS parameter is less than the threshold number.

Example 25 includes the method of any of examples 19-24, and/or some other example herein, wherein the request related to reservation of resources further includes an indication of a time period related to the QoS parameter.

Example 26 includes the method of example 25, and/or some other example herein, wherein the time period related to the QoS parameter is based on a determination by a machine learning (ML) model of the AF that is related to tolerance for UE dropout.

Example 27 includes the method of example 25, and/or some other example herein, wherein the request related to reservation of resources includes one or more of: an External Group identifier (ID), an indication of a wireless link condition threshold, an indication of a deadline for parameter update, an indication of quality of data, an indication of traffic volume for the requested QoS, an an indication of a threshold number related to a minimum UEs in the group with the requested QoS.

Example Z01 may include an apparatus comprising means to perform one or more elements of a method described in or related to any of examples 1-27, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-27, or any other method or process described herein.

Example Z03 may include an apparatus comprising logic, modules, or circuitry to perform one or more elements of a method described in or related to any of examples 1-27, or any other method or process described herein.

Example Z04 may include a method, technique, or process as described in or related to any of examples 1-27, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-27, or portions thereof.

Example Z06 may include a signal as described in or related to any of examples 1-27, or portions or parts thereof.

Example Z07 may include a datagram, packet, frame, segment, protocol data unit (PDU), or message as described in or related to any of examples 1-27, or portions or parts thereof, or otherwise described in the present disclosure.

Example Z08 may include a signal encoded with data as described in or related to any of examples 1-27, or portions or parts thereof, or otherwise described in the present disclosure.

Example Z09 may include a signal encoded with a datagram, packet, frame, segment, protocol data unit (PDU), or message as described in or related to any of examples 1-27, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-27, or portions thereof.

Example Z11 may include a computer program comprising instructions, wherein execution of the program by a processing element is to cause the processing element to carry out the method, techniques, or process as described in or related to any of examples 1-27, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

| Abbreviation | Meaning |
|---|---|
| 3GPP | Third Generation Partnership Project |
| 4G | Fourth Generation |
| 5G | Fifth Generation |
| 5GC | 5G Core network |
| ACK | Acknowledgement |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASN.1 | Abstract Syntax Notation One |
| ASP | Application Service Provider |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CFRA | Contention Free Random Access |
| CG | Cell Group |
| CI | Cell Identity |
| CID | Cell-ID (e g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |

-continued

| | |
|---|---|
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell-specific Search Space |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| EAS | Edge Application Server |
| ECCA | extended clear channel assessment, extended CCA |
| ECCE | Enhanced Control Channel Element, Enhanced CCE |
| ECSP | Edge Computing Service Provider |
| ED | Energy Detection |
| EDGE | Enhanced Datarates for GSM Evolution (GSM Evolution) |
| EES | Edge Enabler Server |
| EGMF | Exposure Governance Management Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| EV2X | Enhanced V2X |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |

-continued

| | |
|---|---|
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FMSS | Flexible Mobile Service Steering |
| FN | Frame Number |
| FPGA | Field-Programmable Gate Array |
| FR | Frequency Range |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GSM | Global System for Mobile Communications, Groupe Spécial Mobile |
| GTP | GPRS Tunneling Protocol |
| GTP-UGPRS | Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, e.g. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |

-continued

| | |
|---|---|
| ISIM | IM Services Identity Module |
| ISO | International Organisation for Standardisation |
| ISP | Internet Service Provider |
| IWF | Interworking-Function |
| I-WLAN | Interworking WLAN Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-IMAC | used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MnS | Management Service |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |
| mMTC | massive MTC, massive Machine-Type Communications |
| MU-MIMO | Multi User MIMO |

-continued

| | |
|---|---|
| MWUS | MTC wake-up signal, MTC WUS |
| NACK | Negative Acknowledgement |
| NAI | Network Access Identifier |
| NAS | Non-Access Stratum, Non-Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit - type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |

-continued

| | |
|---|---|
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSFCH | Physical Sidelink Feedback Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |
| S1-U | S1 for the user plane |
| S-GW | Serving Gateway |
| S-RNTI | SRNC Radio Network Temporary Identity |
| S-TMSI | SAE Temporary Mobile Station Identifier |

-continued

| | |
|---|---|
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDU | Service Data Unit |
| SEAF | Security Anchor Function |
| SeNB | secondary eNB |
| SEPP | Security Edge Protection Proxy |
| SFC | Service Function Chaining |
| SFP | Serivce Function Path(s) |
| SFI | Slot format indication |
| SFTD | Space-Frequency Time Diversity, SFN and frame timing difference |
| SFN | System Frame Number or Single Frequency Network |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | SS Block |
| SSBRI | SSB Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |

-continued

| | |
|---|---|
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDR | Unified Data Repository |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastructure |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over-Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Power |

Terminology

For the purposes of the present document, the following terms and definitions are applicable to the examples and embodiments discussed herein.

The term "application" may refer to a complete and deployable package, environment to achieve a certain function in an operational environment. The term "AI/ML application" or the like may be an application that contains some AI/ML models and application-level descriptions.

The term "machine learning" or "ML" refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data," "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure.

The term "machine learning model," "ML model," or the like may also refer to ML methods and concepts used by an ML-assisted solution. An "ML-assisted solution" is a solution that addresses a specific use case using ML algorithms during operation. ML models include supervised learning (e.g., linear regression, k-nearest neighbor (KNN), decision tree algorithms, support machine vectors, Bayesian algorithm, ensemble algorithms, etc.), unsupervised learning (e.g., K-means clustering, principle component analysis (PCA), etc.), reinforcement learning (e.g., Q-learning, multi-armed bandit learning, deep RL, etc.), neural networks, and the like. Depending on the implementation a specific ML model could have many sub-models as components and the ML model may train all sub-models together. Separately trained ML models can also be chained together in an ML pipeline during inference. An "ML pipeline" is a set of functionalities, functions, or functional entities specific for an ML-assisted solution; an ML pipeline may include one or several data sources in a data pipeline, a model training pipeline, a model evaluation pipeline, and an actor. The "actor" is an entity that hosts an ML assisted solution using the output of the ML model inference. The term "ML training host" refers to an entity, such as a network function, that hosts the training of the model. The term "ML inference host" refers to an entity, such as a network function, that hosts model during inference mode (which includes both the model execution as well as any online learning if applicable). The ML-host informs the actor about the output of the ML algorithm, and the actor takes a decision for an action (an "action" is performed by an actor as a result of the output of an ML assisted solution). The term "model inference information" refers to information used as an input to the ML model for determining inference(s); the data used to train an ML model and the data used to determine inferences may overlap, however, "training data" and "inference data" refer to different concepts.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The invention claimed is:

1. One or more non-transitory computer-readable media (NTCRM) comprising instructions that, when executed by one or more processors of an electronic device, are to cause a network exposure function (NEF) of a cellular network to:
identify, from an application function (AF) that implements a machine learning (ML) model, a request related to reservation of resources for a plurality of AF sessions, wherein the plurality of AF sessions relate to respective user equipments (UEs) of a plurality of UEs, and wherein the request includes an indication of addresses of respective UEs of the plurality of UEs and a quality of service (QoS) parameter;
transmit, to a binding support function (BSF) of the cellular network, a discovery request related to discovery of respective policy control functions (PCFs) that are serving the respective UEs of the plurality of UEs;
identify, based on the discovery request, a discovery response that includes indications of the PCFs;
identify, based on the indications of the PCFs and the QoS parameter, a result related to the reservation of resources; and
transmit, to the AF, an indication of the result.

2. The one or more NTCRM of claim 1, wherein the request related to reservation of resources is a Nnef_GroupAFsessionWithQoS_Create request message.

3. The one or more NTCRM of claim 1, wherein the discovery request is a Nbsf_Management_Discovery request message.

4. The one or more NTCRM of claim 1, wherein the discovery response is a Nbsf_Management_Discovery response message.

5. The one or more NTCRM of claim 1, wherein the result is granting the request related to reservation of resources if a number of UEs of the plurality of UEs that are associated with a PCF that meets the QoS parameter is greater than a threshold number.

6. The one or more NTCRM of claim 1, wherein the result is declining the request related to reservation of resources if a number of UEs of the plurality of UEs that are associated with a PCF that meets the QoS parameter is less than the threshold number.

7. The one or more NTCRM of claim 1, wherein the request related to reservation of resources further includes an indication of a time period related to the QoS parameter.

8. The one or more NTCRM of claim 7, wherein the time period related to the QoS parameter is based on a determination by a machine learning (ML) model of the AF that is related to tolerance for UE dropout.

9. The one or more NTCRM of claim 7, wherein the request related to reservation of resources includes: an External Group identifier (ID), an indication of a wireless link condition threshold, an indication of a deadline for parameter update, an indication of quality of data, an indication of traffic volume for the requested QoS, an an indication of a threshold number related to a minimum UEs in the group with the requested QoS.

10. An electronic device comprising:
one or more processors to implement a network exposure function (NEF) of a cellular network; and
one or more non-transitory computer-readable media (NTCRM) comprising instructions that, when executed by the one or more processors, are to cause the NEF to:
identify, from an application function (AF) that implements a machine learning (ML) model, a request related to reservation of resources for a plurality of AF sessions, wherein the plurality of AF sessions relate to respective user equipments (UEs) of a plurality of UEs, and wherein the request includes an indication of addresses of respective UEs of the plurality of UEs and a quality of service (QoS) parameter;
transmit, to a binding support function (BSF) of the cellular network, a discovery request related to discovery of respective policy control functions (PCFs) that are serving the respective UEs of the plurality of UEs;
identify, based on the discovery request, a discovery response that includes indications of the PCFs;
identify, based on the indications of the PCFs and the QoS parameter, a result related to the reservation of resources; and
transmit, to the AF, an indication of the result.

11. The electronic device of claim 10, wherein the request related to reservation of resources is a Nnef_GroupAFsessionWithQoS_Create request message.

12. The electronic device of claim 10, wherein the discovery request is a Nbsf_Management_Discovery request message.

13. The electronic device of claim 10, wherein the discovery response is a Nbsf_Management_Discovery response message.

14. The electronic device of claim 10, wherein the result is granting the request related to reservation of resources if a number of UEs of the plurality of UEs that are associated with a PCF that meets the QoS parameter is greater than a threshold number.

15. The electronic device of claim 10, wherein the result is declining the request related to reservation of resources if a number of UEs of the plurality of UEs that are associated with a PCF that meets the QoS parameter is less than the threshold number.

16. The electronic device of claim 10, wherein the request related to reservation of resources further includes an indication of a time period related to the QoS parameter.

17. A method to be performed by a network exposure function (NEF) of a cellular network, wherein the method comprises:
identifying, from an application function (AF) that implements a machine learning (ML) model, a request related to reservation of resources for a plurality of AF sessions, wherein the plurality of AF sessions relate to respective user equipments (UEs) of a plurality of UEs, and wherein the request includes an indication of addresses of respective UEs of the plurality of UEs and a quality of service (QoS) parameter;
transmitting, to a binding support function (BSF) of the cellular network, a discovery request related to discovery of respective policy control functions (PCFs) that are serving the respective UEs of the plurality of UEs;
identifying, based on the discovery request, a discovery response that includes indications of the PCFs;
identifying, based on the indications of the PCFs and the QoS parameter, a result related to the reservation of resources; and
transmitting, to the AF, an indication of the result.

18. The method of claim 17, wherein the request related to reservation of resources is a Nnef_GroupAFsessionWithQoS_Create request message.

19. The method of claim 17, wherein the discovery request is a Nbsf_Management_Discovery request message.

20. The method of claim 17, wherein the discovery response is a Nbsf_Management_Discovery response message.

* * * * *